United States Patent
Yao et al.

(10) Patent No.: US 8,018,999 B2
(45) Date of Patent: Sep. 13, 2011

(54) ALGORITHM DESCRIPTION ON NON-MOTION BLUR IMAGE GENERATION PROJECT

(75) Inventors: Tianxiang Yao, Zhejiang (CN); Yiqing Jin, Zhejiang (CN); Donghui Wu, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 1418 days.

(21) Appl. No.: 11/295,236

(22) Filed: Dec. 5, 2005

(65) Prior Publication Data

US 2007/0127574 A1    Jun. 7, 2007

(51) Int. Cl.
- H04N 7/12 (2006.01)
- H04N 5/228 (2006.01)
- G06K 9/40 (2006.01)
- G06K 9/36 (2006.01)
- G06K 9/32 (2006.01)

(52) U.S. Cl. ......... 375/240.16; 375/240.24; 375/240.26; 348/208.4; 348/208.6; 348/208.13; 348/208.14; 382/255; 382/291; 382/294; 382/299

(58) Field of Classification Search ............... 348/208.4, 348/208.6, 208.13, 208.14; 375/240.16, 375/240.24, 240.26; 382/255, 291, 294, 382/299

See application file for complete search history.

(56) References Cited

U.S. PATENT DOCUMENTS

| | | | |
|---|---|---|---|
| 6,473,460 B1 * | 10/2002 | Topper | 375/240.16 |
| 6,570,624 B2 * | 5/2003 | Cornog et al. | 348/446 |
| 6,741,757 B1 | 5/2004 | Torr et al. | |
| 7,120,277 B2 * | 10/2006 | Pelagotti et al. | 382/107 |
| 7,346,222 B2 * | 3/2008 | Lee et al. | 382/260 |
| 2004/0091170 A1 * | 5/2004 | Cornog et al. | 382/276 |
| 2005/0013501 A1 * | 1/2005 | Kang et al. | 382/254 |
| 2005/0018927 A1 * | 1/2005 | Manabe | 382/294 |
| 2006/0017837 A1 * | 1/2006 | Sorek et al. | 348/362 |

OTHER PUBLICATIONS

"Combining Images, Stacking images to reduce noise," Starizona, Adventures in Astronomy & Nature, Internet paper, downloaded from http://www.starizona.com/ccd/procbasiccomb.htm, pp. 1-5.
"Combining Images, Stacking images to enhance detail," Starizona, Adventures in Astronomy & Nature, Internet paper, downloaded from http://www.starizona.com/ccd/procbasiccomb.htm, pp. 1-6.

* cited by examiner

Primary Examiner — Sudhanshu C Pathak
Assistant Examiner — Mesfin Getaneh
(74) Attorney, Agent, or Firm — Patent Law Group LLP; David C. Hsia

(57) ABSTRACT

A method for simulating an image captured at a long exposure time ("simulated image"), includes (1) capturing each of first, second, and third images at a short exposure time, (2) determining a first relative motion between the first and the second images, (3) transforming the first image to remove the first relative motion, (4) determining a second relative motion between the third and the second images, (5) transforming the third image to remove the second relative motion, and (6) combining the first, the second, and the third images to form the simulated image. Relative motions between images are determined by matching blocks at multiple resolutions to determine corresponding points between the images. Transformation to remove relative motion is determined by fitting corresponding points between the images using a minimum square error (MSE) algorithm in a random sample consensus (RANSAC) framework.

12 Claims, 2 Drawing Sheets

ALGORITHM DESCRIPTION ON NON-MOTION BLUR IMAGE GENERATION PROJECT

FIELD OF INVENTION

This invention relates to a method for simulating an image captured with a long exposure time.

DESCRIPTION OF RELATED ART

Camera shake occurs while the shutter is open and exposing the image sensor in a digital camera. Any movement of the camera will show up in the image as motion lines, ghost images, and other motion blurs. This often happens in low light where a longer shutter speed is needed to fully expose the image. Long focus further exaggerates the camera shake. One solution to camera shake is to use a tripod to stabilize the camera. Of course, this solution is inconvenient as the user has to carry the tripod.

Thus, what is needed is a method that addresses camera shake for a digital camera.

BRIEF DESCRIPTION OF THE DRAWINGS

Use of the same reference numbers in different figures indicates similar or identical elements.

SUMMARY

In one embodiment of the invention, a method for simulating an image captured at a long exposure time ("simulated image"), includes (1) capturing each of first, second, and third images at a short exposure time, (2) determining a first relative motion between the first and the second images, (3) transforming the first image to remove the first relative motion, (4) determining a second relative motion between the third and the second images, (5) transforming the third image to remove the second relative motion, and (6) combining the first, the second, and the third images to form the simulated image. Relative motions between images are determined by matching blocks at multiple resolutions to determine corresponding points between the images. Transformation to remove relative motion is determined by fitting corresponding points between the images using a minimum square error (MSE) algorithm in a random sample consensus (RANSAC) framework.

DETAILED DESCRIPTION

In embodiments of the invention, three images are each captured with a short exposure time and then combined to simulate an image captured with a long exposure time. Due to the short exposure time, the three images will not have any motion blur due to camera shake. The three images are motion-compensated so the simulated image will not have any motion blur due to the change in the camera position in-between shots.

Figure 1:
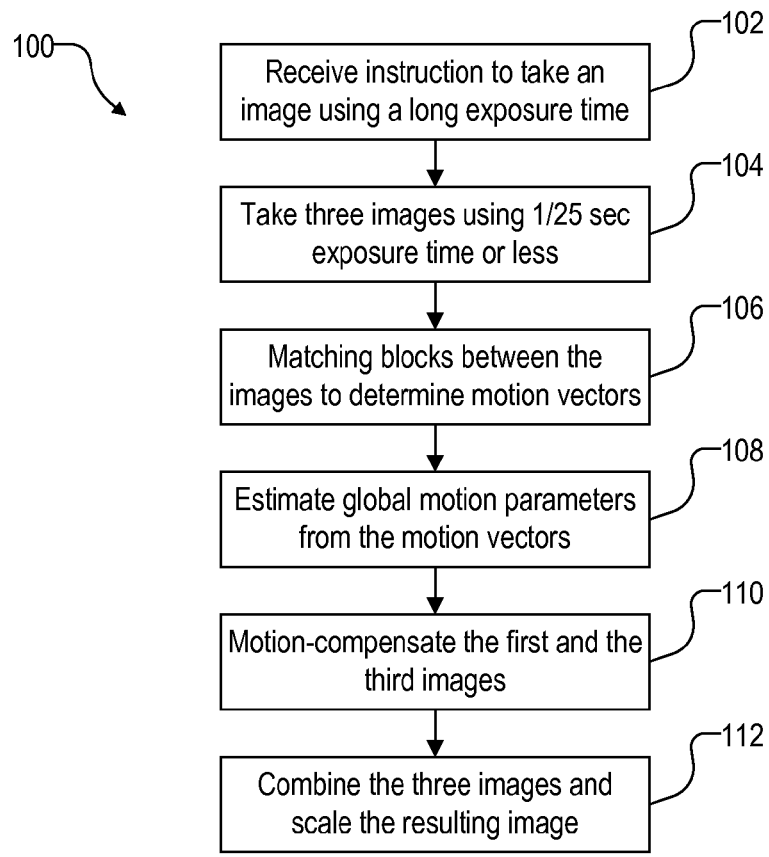
FIG. 1 is a flowchart of a method for simulating an image taken with a long exposure in one embodiment of the invention.

FIG. 1 is a flowchart of a method 100 for simulating an image captured with a long exposure time in one embodiment of the invention. Method 100 may be implemented with a processor executing firmware in a digital camera, or any equivalent thereof.

In step 102, the processor detects a user attempting to take an image using a long exposure time. In one embodiment, the processor detects that the user has set the exposure time to greater than $\frac{1}{5}$ second and has pressed the shutter release button to capture the image.

Figure 3:
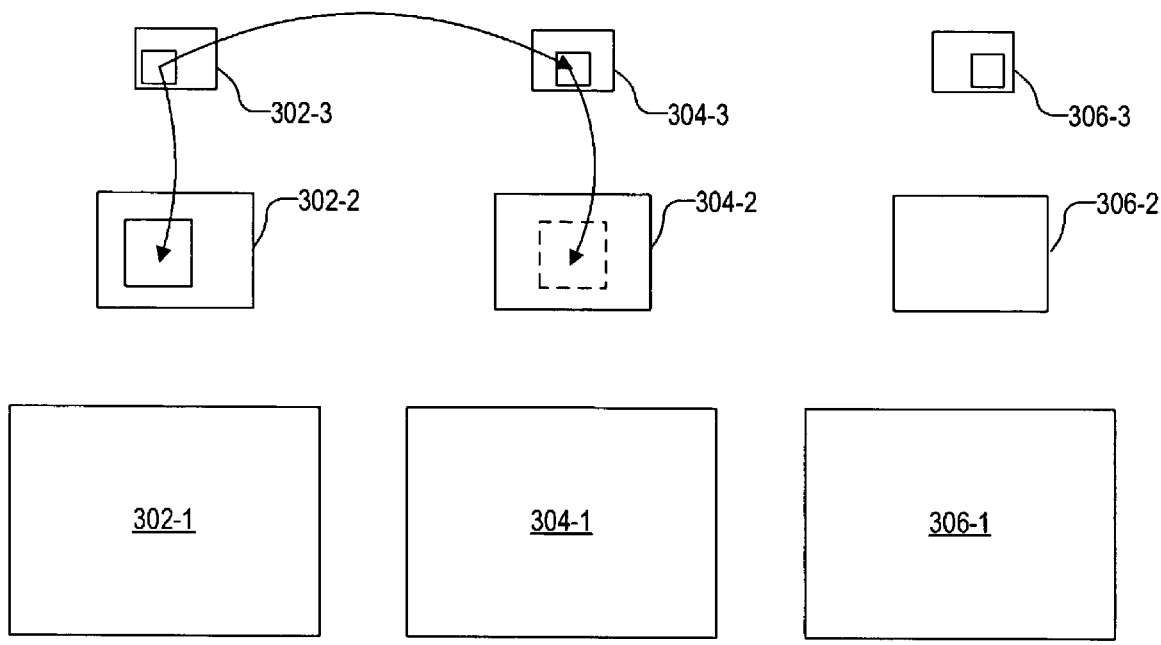
FIGS. 3 and 4 illustrate the block matching method of FIG. 2 in one embodiment to the invention.

In step 104, the processor instructs the digital camera to take a number of images each with a short exposure time. In one embodiment, the processor instructs the digital camera to capture three images 302-1, 304-1, and 306-1 (FIG. 3). In one embodiment, the short exposure is $\frac{1}{25}$ second or less. At the short exposure time, the images will not contain any motion blur due to camera shake. Furthermore, the digital camera stores images 302-1, 304-1, and 306-1 in their raw format without any further processing of the image sensor (e.g., CCD) data. This is because the raw data is linearly related to the brightness of each image.

In step 106, the processor determines the corresponding points in the three images. In one embodiment, the processor selects second image 304-1 as the reference image. The processor compares first image 302-1 with second image 304-1 to match blocks between them, and then compares third image 306-1 with the second image 304-1 to match blocks between them. From the center points of these matching blocks, the processor determines the corresponding points between the two pairs of images.

Figure 2:
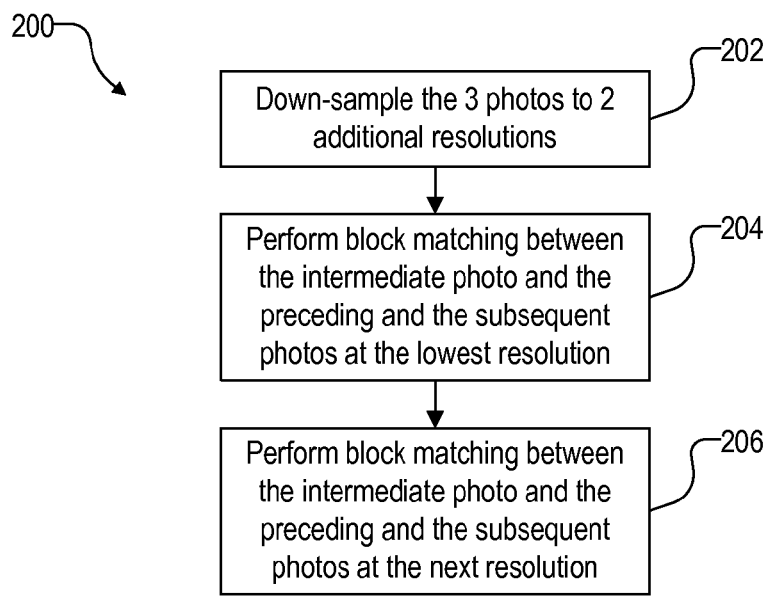
FIG. 2 is a flowchart of a method for block matching between images in one embodiment of the invention.
Figure 4:
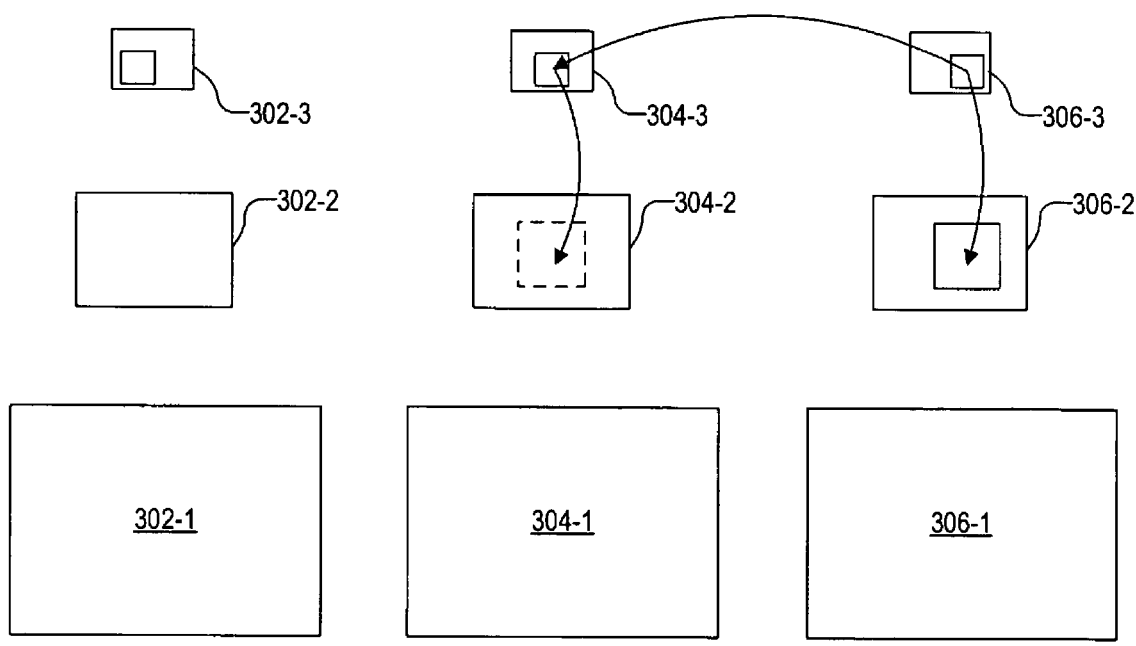

FIG. 2 is a flowchart of a method 200 for block matching between a current image and a reference image in one embodiment of the invention. Method 200 is now explained in reference to block matching between first image 302-1 and second image 304-1 as shown in FIG. 3. It is understood that method 200 can be applied in parallel to match blocks between third image 306-1 and second image 304-1 as shown in FIG. 4.

In step 202, the processor down-samples images 302-1 and 304-1 to two additional resolutions. In one embodiment, images 302-1 and 304-1 are first down-sampled to $\frac{1}{2}$ of their original resolution (shown as images 302-2 and 304-2 in FIG. 3), and then to $\frac{1}{8}$ of their original resolution (shown as images 302-3 and 304-3 in FIG. 3). In one embodiment, the original image size is 2616 by 1960 pixels.

In step 204, the processor performs block matching between two images 302-1 and 304-1 at $\frac{1}{8}$ resolution. In one embodiment, the processor breaks the images into blocks. For blocks in the current image, the processor searches for corresponding blocks in the reference image that satisfy some minimum sum of absolute difference (SAD).

In step 206, the processor performs block matching between the two images 302-1 and 304-1 at $\frac{1}{2}$ resolution. The results of the block matching at $\frac{1}{8}$ resolution are propagated to the blocking matching at $\frac{1}{2}$ resolution. Specifically, the location of the best matched blocks in reference image 304-1 at $\frac{1}{8}$ resolution are used as the starting points for searching in reference image 304-1 at $\frac{1}{2}$ resolution. Once the best matching blocks are located, the processor has identified corresponding pixel points (the center points of the blocks) between images 302-1 and 304-1 at $\frac{1}{2}$ resolution. This correspondence is propagated to images 302-1 and 304-1 at their original resolution.

Block matching is not performed for the two images at their original resolution because experiments show that block matching at $\frac{1}{2}$ resolution is already sufficient for accurate motion estimation. Furthermore, as even images captured at the short exposure time (e.g., $\frac{1}{25}$ sec) have motion blur (although imperceptible to the human eyes), block matching at the original resolution may not be able to achieve better performance than block matching at ½ resolution.

Returning to FIG. 1, in step 108, the processor determines global motion parameters from the corresponding points between first image 302-1 and second image 304-1, and between third image 306-1 and second image 304-1. In one embodiment, the global motion of the digital camera is assumed as follows:

$$\begin{bmatrix} x_i & -y_i & 1 & 0 \\ y_i & x_i & 0 & 1 \end{bmatrix} \times \begin{bmatrix} a \\ b \\ dx \\ dy \end{bmatrix} = \begin{bmatrix} x_i' \\ y_i' \end{bmatrix} \quad (1)$$

where $x_i$ and $y_i$ are the coordinates of a pixel point in first image 302-1 (or third image 306-1); a, b, dx, and dy are the global motion parameters between the first image 302-1 (or third image 306-1) and second image 304-1; and $x_i'$ and $y_i'$ are the coordinates of the pixel point after motion compensation.

The processor then fits the corresponding points determined in step 106 into equation 1 using a minimum square error (MSE) algorithm. To improve the robustness of the motion estimation, the MSE algorithm is incorporated into a random sample consensus (RANSAC) framework.

In step 110, first image 302-1 and third image 306-1 are motion compensated so they match second image 304-1.

In step 112, images 302-1, 304-1, and 306-1 are linearly combined and then scaled as follows:

$$I(i, j) = \left( I_0(i, j) + \sum_{l=1}^{N-1} I_l'(i, j) \right) \times k, \quad (2)$$

where $I(i, j)$ is the pixel value of a pixel located at $(i, j)$ in the simulated image, $I_0(i, j)$ is the original pixel value of a pixel located at $(i, j)$ in reference image 304-1, N is the number of images captured to generate the simulated image, $I_1'(i,j)$ is the pixel value of a pixel located at $(i, j)$ in the images captured to generate the simulated image after motion compensation, and k is a linear coefficient for scaling the results. In one embodiment where N=3, k is set as 5.0/3.0.

As the pixel values are enhanced by N×k times, it is important to determine the resulting signal-to-noise ratio (SNR) of the simulated image. Suppose the value of a particular point on the image is s and it is corrupted by the additive noise n, then the observed value is r=s+n. If noise n ∈ $N(0,\sigma^2)$, where σ is the deviation, then SNR becomes $s^2/\sigma^2$. A linear combination is as follows:

$$r' = \sum_{l=0}^{N-1} s_l + \sum_{l=0}^{N-1} n_l,$$

$$s' = \sum_{l=0}^{N-1} s_l, \quad n' = \sum_{l=0}^{N-1} n_l,$$

where r' is the total observed value after combining the images, s' is the total pixel value after combining the images, and n' is the total noise value after combining the images.

If motion estimation is perfect, then $s_l$=s and $n_l$ ∈ $N(0,\sigma^2)$, so s'=Ns, n'∈ $(0, N\sigma^2)$. Thus, the SNR is $(Ns)^2/(N\sigma^2)$=N×$(s^2/\sigma^2)$, which is N times the original SNR of each of the three images. Thus, the SNR is increased by combining the images to generate the simulated image.

Various other adaptations and combinations of features of the embodiments disclosed are within the scope of the invention. Numerous embodiments are encompassed by the following claims.

What is claimed is:

1. A method for simulating an image captured at a long exposure time ("simulated image"), comprising:
   capturing each of a first image, a second image, and a third image at a short exposure time;
   matching blocks in the first image with blocks in the second image to determine a first plurality of motion vectors between the first and the second images, said matching comprising:
      down-sampling both the first and the second images from an original resolution to a first resolution and a second resolution, wherein the second resolution is lower than the first resolution;
      matching blocks between the first and the second images at the second resolution;
      propagating locations of center pixels of the matching blocks at the second resolution to both the first and the second images at the first resolution;
      using the propagated locations of the center pixels of the matching blocks at the second resolution as starting points, matching blocks between the first and the second images at the first resolution; and
      propagating locations of center pixels of the matching blocks at the first resolution to both the first and the second images at the original resolution to determine corresponding points between the first and the second images;
   determining, using a processor, a first global motion between the first and the second images from the first plurality of motion vectors, said determining comprising:
      fitting the corresponding points between the first and the second images using a random sample consensus (RANSAC) algorithm to determine the motion parameters of the first global motion between the first and the second images;
   transforming the first image to compensate for the first global motion;
   matching blocks in the third image with the blocks in the second image to determine a second plurality of motion vectors between the third and the second images;
   determining, using the processor, a second global motion between the third and the second images from the second plurality of motion vectors;
   transforming the third image to compensate for the second global motion; and
   combining the first, the second, and the third images linearly to form the simulated image.

2. The method of claim 1, wherein the short exposure time is at most 1/25 second.

3. The method of claim 1, wherein the long exposure time is at least 1/5 second.

4. The method of claim 1, wherein said transforming the first image comprises determining a transformation comprising:

$$\begin{bmatrix} x_i & -y_i & 1 & 0 \\ y_i & x_i & 0 & 1 \end{bmatrix} \times \begin{bmatrix} a \\ b \\ dx \\ dy \end{bmatrix} = \begin{bmatrix} x'_i \\ y'_i \end{bmatrix},$$

where $x_i$ and $y_i$ are the coordinates of a pixel point in the first image; a, b, dx, and dy are motion parameters of the first global motion between the first and the second images; and $x_i'$ and $y_i'$ are the coordinates of the pixel point after motion compensation.

5. The method of claim 1, further comprising scaling the simulated image by a factor.

6. The method of claim 5, wherein said combining the first, the second, and the third images linearly comprises:

$$I(i, j) = \left( I_0(i, j) + \sum_{l=1}^{N-1} I'_l(i, j) \right) \times k,$$

where I(i, j) is pixel value of at a pixel located at (i, j) in the simulated image, $I_0$(i, j) is original pixel value of a pixel located at (i, j) in the second image, N is the number of images captured to generate the simulated image, $I_l$(i, j) is pixel value of a pixel located at (i, j) in the first and the third images, and k is a linear coefficient for scaling the results.

7. A non-transitory computer-readable storage medium encoded with executable instructions for execution by a processor to simulate an image captured at a long exposure time ("simulated image"), the instructions comprising:
  capturing each of a first image, a second image, and a third image at a short exposure time;
  matching blocks in the first image with blocks in the second image to determine a first plurality of motion vectors between the first and the second images, said matching comprising:
    down-sampling both the first and the second images from an original resolution to a first resolution and a second resolution, wherein the second resolution is lower than the first resolution;
    matching blocks between the first and the second images at the second resolution;
    propagating locations of center pixels of the matching blocks at the second resolution to both the first and the second images at the first resolution;
    using the propagated locations of the center pixels of the matching blocks at the second resolution as starting points, matching blocks between the first and the second images at the first resolution; and
    propagating locations of center pixels of the matching blocks at the first resolution to both the first and the second images at the original resolution to determine corresponding points between the first and the second images;
  determining, using a processor, a first global motion between the first and the second images from the first plurality of motion vectors, said determining comprising:
    fitting the corresponding points between the first and the second images using a random sample consensus (RANSAC) algorithm to determine the motion parameters of the first global motion between the first and the second images;
  transforming the first image to compensate for the first global motion;
  matching blocks in the third image with the blocks in the second image to determine a second plurality of motion vectors between the third and the second images;
  determining, using the processor, a second global motion between the third and the second images from the second plurality of motion vectors;
  transforming the third image to compensate for the second global motion; and
  combining the first, the second, and the third images linearly to form the simulated image.

8. The non-transitory computer-readable storage medium of claim 7, wherein the short exposure time is at most 1/25 second.

9. The non-transitory computer-readable storage medium of claim 7, wherein the long exposure time is at least 1/5 second.

10. The non-transitory computer-readable storage medium of claim 7, wherein said transforming the first image comprises determining a transformation comprising:

$$\begin{bmatrix} x_i & -y_i & 1 & 0 \\ y_i & x_i & 0 & 1 \end{bmatrix} \times \begin{bmatrix} a \\ b \\ dx \\ dy \end{bmatrix} = \begin{bmatrix} x'_i \\ y'_i \end{bmatrix},$$

where $x_i$ and $y_i$ are the coordinates of a pixel point in the first image; a, b, dx, and dy are motion parameters of the first global motion between the first and the second images; and $x_i'$ and $y_i'$ are the coordinates of the pixel point after motion compensation.

11. The non-transitory computer-readable storage medium of claim 7, wherein the instructions further comprise scaling the simulated image by a factor.

12. The non-transitory computer-readable storage medium of claim 11, wherein said combining the first, the second, and the third images linearly comprises:

$$I(i, j) = \left( I_0(i, j) + \sum_{l=1}^{N-1} I'_l(i, j) \right) \times k,$$

where I(i, j) is pixel value of a pixel located at (i, j) in the simulated image, $I_0$(i, j) is original pixel value of a pixel located at (i, j) in the second image, N is the number of images captured to generate the simulated image, $I_l$(i, j) is pixel value of a pixel located at (i, j) in the first and the third images, and k is a linear coefficient for scaling the results.

* * * * *

UNITED STATES PATENT AND TRADEMARK OFFICE
CERTIFICATE OF CORRECTION

PATENT NO. : 8,018,999 B2  
APPLICATION NO. : 11/295236  
DATED : September 13, 2011  
INVENTOR(S) : Tianxiang Yao, Yiqing Jin and Donghui Wu Page 1 of 1

It is certified that error appears in the above-identified patent and that said Letters Patent is hereby corrected as shown below:

Column 5,

Lines 10-11, Claim 4, where "and $x_i$ and $y_i$ are" should read --and $x'_i$ and $y'_i$ are--.

Column 5,

Line 23, Claim 6, where "of at a pixel" should read --of a pixel--.

Column 5,

Line 26, Claim 6, where "$I_l(i, j)$" should read -- $I'_l(i, j)$ --.

Column 6,

Lines 37-38, Claim 10, where "and $x_i$ and $y_i$ are" should read --and $x'_i$ and $y'_i$ are--.

Column 6,

Line 55, Claim 12, where "$I_l(i, j)$" should read -- $I'_l(i, j)$ --.

Signed and Sealed this  
Twenty-fifth Day of October, 2011

David J. Kappos  
*Director of the United States Patent and Trademark Office*